United States Patent Office 3,483,052
Patented Dec. 9, 1969

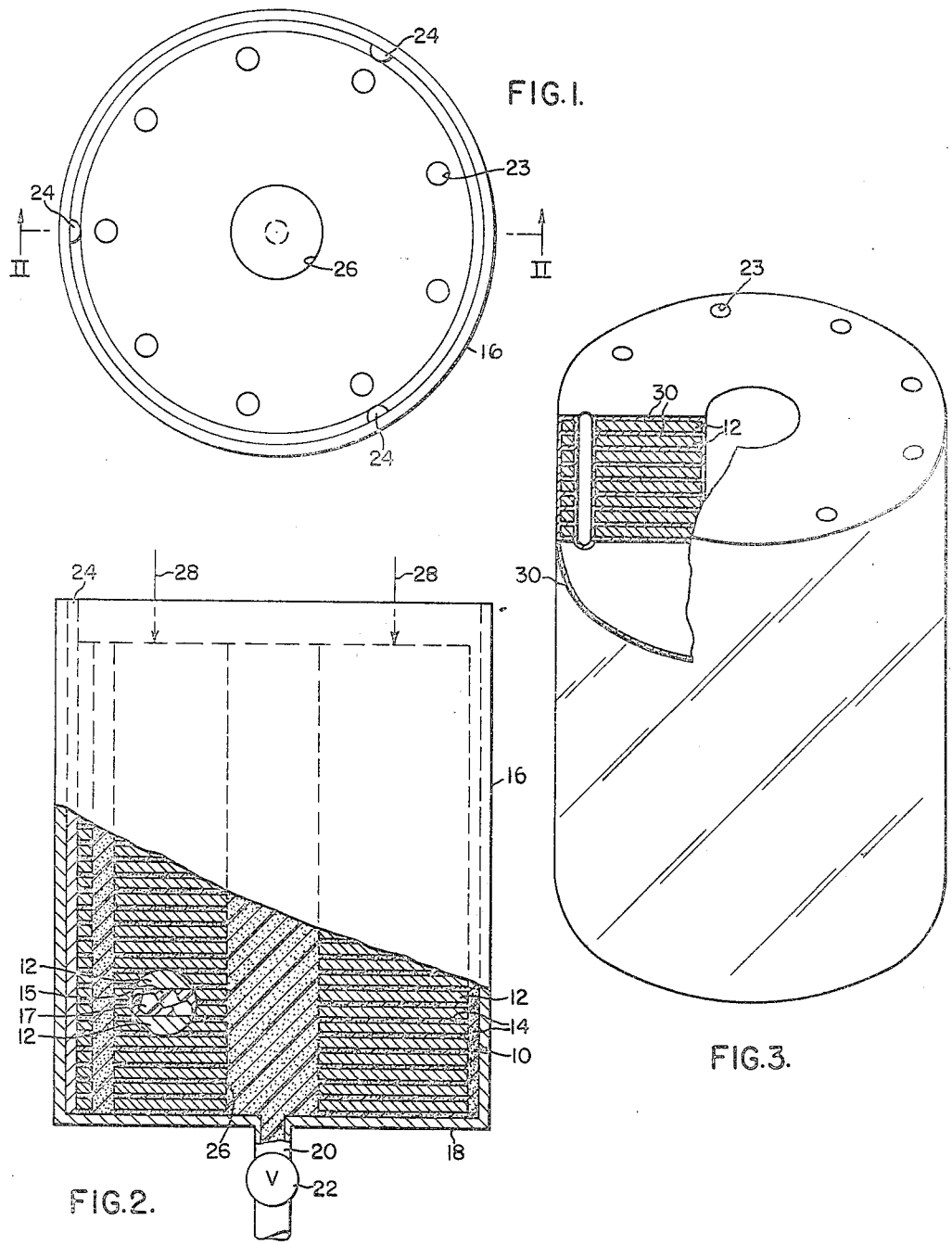

3,483,052
BONDING METHOD OF LAMINATED
STRUCTURES WITH GLASS
Joseph Seidel and Morris A. Mendelsohn, Pittsburgh, Pa., assignors to Westinghouse Electric Corporation, Pittsburgh, Pa., a corporation of Pennsylvania
Filed July 13, 1966, Ser. No. 564,808
Int. Cl. C04b 33/34; C03b 29/00
U.S. Cl. 156—89                     10 Claims

ABSTRACT OF THE DISCLOSURE

A method for bonding a laminated metal structure with glass including (1) immersing spaced metal sheets in a slurry of glass particles suspended in a polymerizable monomeric resinous composition whose polymer is capable of being depolymerized at elevated temperatures, (2) compressing the stacked sheets to a predetermined space factor, (3) curing the resin composition at a low temperature to a solid resin bonding the laminations as a core, (4) depolymerizing the resin at from about 250° C. to 500° C. to volatilize the resin without producing any appreciable carbonaceous products, and (5) heating the assembly to fuse the glass particles and to obtain a continuous fused glass bond between the sheets to provide a bonded core.

---

This invention relates to a method for applying inorganic insulation to laminated electrical metal parts and particularly for producing bonded magnetic cores for transformers, stators, rotors, and the like suitable for prolonged use at temperatures in excess of about 250° C.

One known method for coating metal substrates with an impervious and durable glass coating, as set forth in U.S. Patent 3,089,787, is by first dipping wire or the like into a suspension of solid glass particles in a polyester resin dissolved in a solvent. After dipping, the solvent is evaporated and on further baking the resin is burned off. The remaining glass particles on the substrate are then fused into a glassy coating. Such a procedure is generally satisfactory for coating wire and other objects with thin surface coatings and where the coated member is completely exposed to the surrounding atmosphere to facilitate evaporation of the solvent.

One difficulty with that dipping procedure just described is that prior to evaporation of the solvent the glass particles are readily dislodged when contacted by any object, and complete coverage of the member with glass is precluded because the members must be supported on at least one point during dipping and subsequently baking and fusion. Another disadvantage is that dip coating of individual members such as punchings for transformers or motors having a multiplicity of holes or slots is not conducive to uniform thickness because of edge beading.

A more basic shortcoming of the prior art method is that it is not suited to bond and encapsulate layers of a laminated structure because the solvent of the polyester resin must be evaporated initially. Such evaporation step applied to the original coating greatly diminishes its thickness so that it is not adequate for use for bonding stacked layers of a laminated structure produced by stacking a plurality of punchings.

Another disadvantage of the foregoing method resides in the use of the polyester resin as a carrier for the glass particles, which polyester is preliminarily polymerized and to which a solvent is subsequently added. Thereafter as the solvent leaves the coating during the curing stage the thickness of the remaining coating is greatly diminished which results in voids, air holes, and the like defects.

In accordance with this invention it has been found that the foregoing disadvantages may be overcome by providing a coating composition and method for applying the same by a procedure that provides a simultaneous bonding of the laminations and subsequent simultaneous formation of glass coatings which bond the laminations and encapsulates the structure. The procedure involves the stacking, bonding, and encapsulation of laminations of sheet like members such as transformer core punchings, stator and rotor punchings. The composition includes a thermosetting organic resin, comprising methacrylic monomers, which thermoset resin upon heating to its decomposition temperature depolymerizes to yield volatile degradation products which disappear from the system without leaving carbonaceous residues. Other types of polymers which do not depolymerize substantially completely to volatile products must be excluded because they yield non-volatile residues on the decomposition of the polymer which pyrolize to produce carbonaceous residues which have a deleterious effect on the electrical properties of magnetic materials.

Accordingly, it is a general object of this invention to provide a method employing a composition for the bonding and encapsulation of laminated magnetic metal members with glass.

It is another object of this invention to provide a method employing a composition, based on methacrylic monomers, for bonding and encapsulating laminated electrical components which composition upon heating yield volatile non-carbonaceous residues.

It is another object of this invention to provide a method for bonding and encapsulating electrical component parts with a fused glass coating which is free of voids and defects created during formation of the coating.

It is another object of this invention to provide a method for bonding and encapsulating laminated electrical component parts by providing a fused glass coating that is free of contaminants such as carbonaceous residues.

It is another object of this invention to provide a fused glass coated laminated magnetic core which is capable of functioning at temperatures far greater than those permissible with organic insulations and is only limited by the thermal stability of the other components of the magnetic core.

Finally it is an object of this invention to provide a method for applying a glass coating for laminated electrical component parts that accomplishes the foregoing objects and desiderata in a simple and effective manner.

The invention is particularly directed to a method for producing a glass insulating coating on magnetic members such as punchings including the steps of (1) immersing a stack of magnetic punchings in a slurry of a solventless composition comprising polymerizable methacrylic compounds having high fluidity and a low viscosity, which composition contains in suspension finely ground solid glass particles meltable at about 550° C. and higher, (2) pressing the stacked lamination members to remove the excess slurry from between adjacent surfaces so as to provide a high space factor, (3) curing the stack at a temperature of about 75° C. to 150° C. to polymerize the resin composition while maintaining the stacked laminations under a predetermined load to obtain a rigid and compact magnetic core body the magnetic core body being machinable and storable, (4) heating the laminated magnetic core body while under load to about 350° C. to 500° C. to decompose and volatilize the resin leaving only glass particles on the surfaces of the laminations, and (5) heating the body to a temperature of about 550° C. and higher to fuse the glass particles to produce a coating of glass on all the surfaces and to bond the laminations, into a solid core.

For a better understanding of the nature and objects of this invention reference is made to the drawings, in which:

FIG. 1 is a plan view of stacked laminated electrical members within a container filled with a coating slurry;

FIG. 2 is a vertical sectional view partially in elevation, taken on the line II—II of FIG. 1; and FIG. 3 is a perspective view with portions broken away of the finished product showing the manner in which stacked laminated electrical members are bonded together and entirely encapsulated in glass.

In practicing the first step of the invention, a plurality of magnetic laminations, or other shaped metal members, are introduced into a slurry comprising a specific polymerizable resinous composition with a suspension of finely divided glass particles therein so that all the surfaces are coated with the slurry.

In FIGS. 1 and 2 of the drawings, there is shown a laminated core 10 composed of a plurality of stacked members 12 within a slurry 14. The foregoing are contained within a container or vessel 16 having a bottom wall 18 in which is disposed a central outlet 20 with a valve 22 therein. The several members 12 are composed of magnetic steel such as silicon steel for use as a laminated core, and may be transformer core punchings, stator punchings, and rotor punchings. Other non-electrical or non-magnet bonded bodies composed of laminated metal members can be prepared in this way as well. The members 12 may have slots or openings such as holes 23, for receiving windings as for an AC induction armature. In practice, the container 16 is filled with the slurry and the members 12 are separately dropped into the container one upon the other so that a portion of slurry is trapped between adjacent stacked members 12. When the members 12 are annular to provide a central bore 26 in the component 10, or need to be spaced with respect to each other, means for aligning the peripheries of the members 12 are provided such as spaced vertical ribs 24 located on the inner surface of the container 16.

The slurry 14 is composed of a solventless or completely reactive polymerizable organic resinous composition 15 with ground glass particles or frit 17 suspended therein, as shown in the enlarged area of FIG. 2. More particularly, the organic resinous composition 15 is a completely polymerizable resinous monomeric composition that produces a solid resin on polymerizing which solid resin is subsequently readily completely depolymerizable when heated to a temperature ranging from about 250° C to 500° C. An example of the polymerized resin is a methacrylic polymer which when heated to a moderate temperature, not exceeding for example 500° C., depolymerizes completely to form low molecular weight gaseous products. Other polymers with these properties may be employed. During heating the products leave the system in a gradual manner without distorting the composite. There is no carbonaceous residue left which can deleteriously affect the magnetic material.

An organic resin such as a methacrylic thermosetting composition which has given outstanding results includes the following components in parts by weight:

EXAMPLE A

|  | Range | Optimum |
| --- | --- | --- |
| Butyl methacrylate | 85–100 | 100 |
| Ethylene dimethacrylate | 0.1–10 | 0.1 |
| Benzoyl peroxide | 0.1–2 | 1.00 |
| Tertiary butyl perbenzoate | 0.1–2 | 1.00 |
| Hydroquinone | 0–1 | 0.1 |

Other lower alkyl methacrylic acid derivatives may be substituted for the butyl methacrylate, in part or entirely, such as methyl methacrylate, ethyl methacrylate, propyl methacrylate, isopropyl methacrylate, hexyl methacrylate, lauryl methacrylate, octyl methacrylate, and decyl methacrylate, or mixtures of two or more.

The small amount of ethylene dimethacrylate serves as the cross-linking agent for imparting a moderate degree of thermosetting properties to the resin system. The benzoyl peroxide and tertiary butyl perbenzoate act as a catalyst for initiating the polymerization process. They may be used individually or together. Hydroquinone is a stabilizer and gives improved shelf life of the material prior to its use.

Numerous other catalysts may be substituted for a part of or all of the benzoyl peroxide or tertiary butyl perbenzoate, for example, lauroyl peroxide, di-t-butyl diperphthalate, cumene hydroperoxide and t-butyl peracetate may be employed. In place of the hydroquinone there may be employed benzoquinone, diphenylamine, sulfur, nonylphenol, and nitrobenzene. Mixtures of two or more catalysts, and stabilizers may be incorporated into the resinous composition.

An example of the glass powder which has given excellent results, is the following composition by weight:

EXAMPLE B

|  | Percent |
| --- | --- |
| $SiO_2$ | 49.7 |
| $B_2O_3$ | 16.9 |
| $Al_2O_3$ | 12.1 |
| $Na_2O$ | 14.7 |
| $K_2O$ | 5.4 |
| $CaO$ | 0.5 |
| $ZnO$ | 0.7 |

Other glasses similar to the above borosilicate composition, such as lead borate glasses, are equally usable with the methacrylic resin. The glasses are selected for their electrical properties after fusion to a coating. Their thermal expansion should match reasonably well that of the metal to which the glasses are applied so that the glasses do not crack or spill on cooling to room temperature or thermal cycling in use. It is desirable that the glass viscosity upon final fusion be low so that it spreads and coats the lamination at moderate temperatures from 550° C. to 1000° C. The incipient fusion temperature of the glass particles must be well above the temperature at which the resin decomposes and volatilizes from the system.

The suspension of the resin in glass particles should comprise from about 30 to 70 parts by volume of glass powder and about 70 to 30 parts of the liquid resin composition. The glass particles are of a size of 200 mesh or finer. For best space factor in the core, the glass is carefully sieved to provide a major proportion in a narrow size band, for example all particles passing through 250 mesh sieve with 95% being retained on a 300 mesh sieve.

Generally, a plurality of metal discs composed of high silicon steel such as that having high permeability for use in a transformer are treated for the removal of burrs, as by etching, and cleaned and degreased. The discs are then separately dropped into the slurry within the container 16 in such a manner that their peripheries and the slots or holes 23 are aligned. As one disc settles upon another within the container the slurry between them is displaced. However, a layer of slurry is retained between the discs 12, the thickness being dependent primarily upon the mesh size and concentration of the glass particles. Inasmuch as the particles 17 of glass act as spacers between the discs the larger the particles the thicker the retained coating between discs.

The complete stack of discs 12 are finally compressed by the application of a force or weight amounting to a few pounds per square inch, as indicated by the arrows 28 (FIG. 2) in order to squeeze out any excess slurry between the discs and to provide uniform spacing between the several discs. The valve 22 in the outlet 20 is opened in order to drain the slurry from the container 16.

In order to polymerize the composition, thereafter the assembly 10 of discs is heated for 5 minutes to 3 hours to a temperature ranging from about 75° to 150° C., the preferred conditions being a temperature of about 115° C. for about one-half hour. The higher the temperature the less time involved in polymerizing the monomers. During curing the stacked discs are preferably maintained under a substantially constant predetermined load so as to obtain a rigid and compact assembly with a high space factor. Very little if any polymerization shrinkage occurs in the slurry matrix. No shrinkage results from solvent evaporation. As a result the glass particles 17 are firmly retained in place on all surfaces and as an evenly distributed heterogeneous mixture between successive discs 12. No air, oxygen, or other special atmosphere is necessary during the polymerization.

After the polymerization the rigid and compact core of discs may be stored for an indefinite time before the final steps of curing and glass fusion. If necessary the assembly may be mechanically treated such as by machining the outer periphery to provide alignment with the longitudinal axis, or cutting into segments.

As a result of curing, the laminated core 10, consists of a rigid body of discs bonded together by the cured resin with a high proportion of glass particles therein. At any subsequent time the body may be finally processed by placing it in a high temperature furnace for heating to a higher temperature than previously used. Initially heating in the furnace may be carried but at a temperature ranging from 250 to 450° C., the preferred temperature for the composition of Example A is about 350° C. in order to decompose and volatilize the resin upon all surfaces including between the discs. The body is preferably heated at a rate of about 2° C. per minute above about 150° C. and held at 350° C. for about 1 hour.

Volatilization and escape of the methacrylic resin between the discs occurs at a slow rate because the methacrylic polymer depolymerizes controllably to form monomers or decomposition polymers having a low molecular weight which products are gases at these temperatures and leave the system in a gradual manner without core distortion. Any residual catalyst and stabilizer also volatilizes and escapes. During depolymerization heating the core body is preferably compressed. A stream of gas may be flowed over the core body to facilitate removal of the gaseous decomposition products.

After complete depolymerization of the organic portions of the original slurry, only the glass particles 17 remain on the surfaces and between the adjacent discs 12. The cores may be further heated in the same furnace or moved to another furnace. The temperature of the furnace is then raised to a range of from 700° C. to 825° C. for the glass composition of Example B to fuse the glass particles together into one coating that covers all the metal surfaces and is coextensive with the interfaces between the discs. The resulting glass coating 30 bonds the adjacent discs together. It has been found that it is completely free of voids, flows, distortions and irregularities which would otherwise reduce the insulation properties of the glass coating 30. The magnetic properties of the silicon steel are not adversely affected.

One advantage of using the preferred resin composition having a relatively low curing temperature of about 115° C. and a decomposition temperature of about 350° C., is that glass having lower fusion temperatures than about 700° C., for example, a lead borate glass which melts as low as 425° C., may be used without causing fusion of the glass prior to complete depolymerization of the organic residues.

The following example is exemplary of the present invention.

EXAMPLE I

Nine discs of high permeability silicon steel having a diameter of 1 inch and a thickness of .004 inch are placed in an open top container containing a slurry composed of about 2.3 parts by volume of the optimum composition in Example A, and 1.6 parts by volume of glass particles of Example B having a size of about 400 mesh. The discs are preliminarily deburred in acid, degreased, and cleaned to enhance the subsequent adherence of fused glass thereto and to provide maximum interlaminar resistance. The stack of discs is then compressed under a pressure of a few pounds per square inch to cause excess slurry to flow from between the laminations with the glass particles acting as spacers whereby a thin layer of the resin is retained. This provides a high space factor core. After draining off the excess slurry, the stack of discs is heated for ½ hour at about 115° C. in order to polymerize the monomers and to cure the resin.

During curing the stack was maintained under a substantially constant load of about a pound per square inch to obtain a rigid and compact core stack. After curing for approximately 1 hour the cured laminated body is removed from the container. The core can be stored or machined. Thereafter the core is placed in the furnace where it is heated to about 350° C. at the rate of 2° C. per minute and is held at a temperature for 1 hour to depolymerize the resin and cause it to volatilize completely. Inasmuch as the glass particles fuse at a temperature much higher than 350° C. they do not interfere with the decomposition and volatilization of the methacrylic resin which at the end of the firing period has completely evaporated away from the core. The coating of glass particles remains intact and in place and the temperature is raised to about 825° C. at the rate of about 5° C., per minute in order to fuse the glass particles into a glass coating to provide a completely bonded laminated member in which the metal discs are bonded together by and the entire core is completely encapsulated in the glass. The space factor of the glass bonded core was over 80% which was excellent for the thickness of the laminations and the amount of glass present. Any stresses in the silicon steel laminations are relieved by the elevated temperatures used to fuse the glass coating.

The organic ingredients of the slurry include liquid monomers that form methacrylate polymers upon heating. Methacrylate polymers by themselves are thermoplastic and can distort or give upon heating so that the core is deformed or even delaminated if it is heated about 150° C. For that reason ethylene dimethacrylate or similar polyfunctional monomers, reactive with the alkyl methacrylate, for example, butylene dimethacrylate, divinyl monomers, divinyl benzene, and diallyl esters such as diallyl phthalate are added in small amounts to impart thermosetting characteristics to the polymer matrix. From 0.1% to 1% of the weight of the other monomers is adequate to secure thermoset resins.

In addition, peroxides other than benzoyl peroxide and tertiary butyl perbenzoate may be used as well as other types of free radical generators such as azo compounds (azobisisobutyronitrile) and soluble metal organic complexes for instance (cobalt III) trisacetylacetonate and their primary purpose is to serve as a catalyst to cause polymerization. A small amount of hydroquinone is added to prevent premature polymerization of the methacrylate forming polymers at room temperatures before the desired time. Other free radical acceptors that contain phenolic or amino moieties will also suffice.

It is an important feature that air or oxidizing atmospheres are not required during any of the previously described steps of the process. The monomeric resinous compositions can be polymerized in the absence of air. Full curing does not require air. Removal of the organic polymer by thermal depolymerization does not require air or oxygen, though air can be present and is not deleterious.

Other organic polymers such as polyesters, when subjected to temperatures above their decomposition temperatures in non-oxidizing atmospheres leave some residual carbonaceous products behind. These pyrolysis products can consist of highly cross-linked polymeric fragments and/or indistinct compounds that are rich in carbon. The carbonaceous residues remain embedded in the glass matrix that is formed later and are deleterious to the electrical properties of the resultant glass coating as well as being detrimental to the magnetic steel.

In order to completely remove the residues when decomposing the polymers, other than the methacrylates, oxidizing atmospheres are necessarily employed. Such an atmosphere can consist of air, air enriched with oxygen, oxygen, ozone, chlorine, etc. Employment of air to effect clean removal of the other polymers has been termed burning or burnout. Use of oxidizing atmospheres or air for burn-out is intolerable in almost every application to which this invention is applied, since this results in oxidation or corrosion of the metal. In many cases all resin systems that require burn-out necessitate use of much higher temperatures than do the thermally depolymerizable polymethacrylates in order not to leave a carbonaceous residue. Further, the methacrylate resin systems permit use of glasses having lower fusion temperatures.

In the practice of the present invention an atmosphere of low pressure, or special gases such as nitrogen, argon, and helium may be used to prevent oxidation and corrosion of the steel. Use of a vacuum is advantageous in that it facilitates obtaining void free glass coatings. Finally, glasses having low fusion temperatures can be used where the steel is of a type that readily loses magnetic properties above a selected temperature.

Accordingly, the method of the present invention provides a laminated structure bonded and encapsulated in glass and is useful for many applications including the construction of high temperature cobalt-iron transformer cores. Among other things the invention overcomes the disadvantages of prior art methods by preventing movement or loss of the glass particles prior to fusion and thereby results in a continuous glassy coating free of voids, and other defects conducive to inferior insulating properties.

What is claimed is:

1. A method of producing a laminated electrical core having a plurality of spaced sheets of magnetic metal, including the steps of (1) coating the surfaces of the sheets with a slurry composed of about 30 to 70 parts by volume of fine glass particles suspended in about 30 to 70 parts by volume of a completely polymerizable organic resinous monomeric composition that produces a solid resin on polymerizing which solid resin is subsequently readily completely depolymerizable when heated to a temperature ranging from 250° C. to 500° C., (2) compressing the stack to a predetermined space factor, (3) curing the applied resinous composition at a temperature ranging from about 75° C. to 150° C. to a solid resin bonding the laminations as a core, (4) thereafter depolymerizing the resinous composition at a temperature ranging from about 250° C. to 500° C. so as to volatilize the organic composition without producing any appreciable carbonaceous products, and (5) heating the assembly to a higher temperature sufficient to fuse the applied glass particles and to obtain a continuous fused glass bond between the adjacent magnetic sheets to provide a bonded core.

2. The method of claim 1 in which the resinous composition consists essentially of a lower alkyl methacrylic acid derivative.

3. The method of claim 1 in which the resinous composition has from about 85 to 100 parts by weight of a lower alkyl methacrylic acid derivative, and from about 0.1 to 10.00 parts by weight of ethylene dimethacrylate.

4. The method of claim 3 in which the methacrylic acid derivative is butyl methacrylate.

5. The method of claim 3 in which the resinous composition also includes from about 0.1 to 2 parts by weight of at least one catalyst selected from a group consisting of benzoyl peroxide, tertiary butyl perbenzoate, lauroyl peroxide, di-t-butyl diperphthalate, and t-butyl peracetate.

6. The method of claim 3 in which the resinous composition also includes at least one polymerization inhibitor.

7. The method of claim 6 in which the resinous composition also includes up to 1 part by weight of hydroquinone.

8. The method of claim 1 in which the glass particles have a size of about 200 mesh and finer.

9. The method of claim 1 in which the resinous composition consists of by weight about 100 parts of butyl methacrylate, about 0.1 part of ethylene dimethacrylate, about 1.0 part of benzoyl peroxide, and about 1.0 part of tertiary butyl perbenzoate.

10. The method of claim 1 in which the glass particles are composed of a borosilicate glass having a coefficient of thermal expansion substantially matching that of the magnetic metal.

References Cited

UNITED STATES PATENTS

| 1,495,577 | 5/1924 | Dane | 156—295 XR |
| 2,437,212 | 3/1948 | Schottland | 156—295 XR |
| 3,089,787 | 5/1963 | Sattler et al. | 117—215 |
| 3,325,590 | 6/1967 | Westervelt et al. | 117—218 XR |

HAROLD ANSHER, Primary Examiner

M. E. McCAMISH, Assistant Examiner

U.S. Cl. X.R.
117—215; 156—306